Jan. 23, 1968   H. T. ATWOOD   3,364,879
SEALING PISTON
Filed Dec. 21, 1965
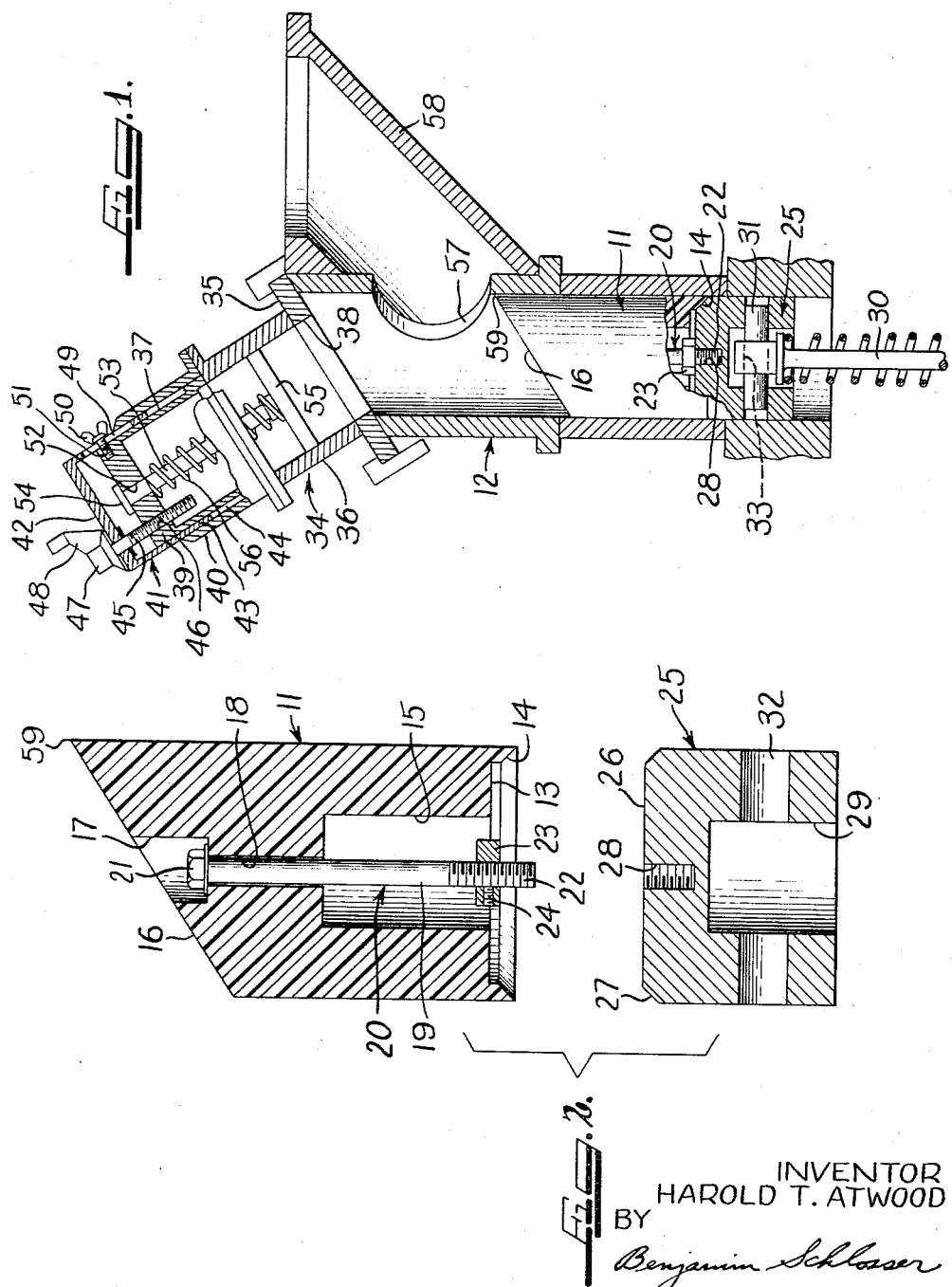
INVENTOR
HAROLD T. ATWOOD
BY
Benjamin Schlosser
Atty.

United States Patent Office 3,364,879
Patented Jan. 23, 1968

3,364,879
SEALING PISTON
Harold T. Atwood, Chicago, Ill.
(14152 Irving Ave., Dalton, Ill. 60419)
Filed Dec. 21, 1965, Ser. No. 515,324
6 Claims. (Cl. 107—15)

This invention relates to a sealing piston particularly designed for use in a dough dividing apparatus such as that described in the copending joint application of applicant and Walter Jaeger Ser. No. 403,484, filed Oct. 13, 1964, now Patent No. 3,311,068.

For convenience, the present invention will be described with reference to the above identified dough dividing apparatus, but it will be understood that the invention is not limited to use with any specific apparatus. The advantages of the invention may be utilized in any suitable environment. In dough dividing appartus of the type described in the above identified application, a piston slidably mounted in a tubular cylinder creates a vacuum on its down stroke to suck dough into the cylinder through an inlet opening, and on its up stroke pushes the dough upwardly through the tubular cylinder into a scaling cup. The dough dividing apparatus will not be described in detail, it being understood that reference may be made to said above identified application for such description.

In accordance with the present invention, the piston is made of any suitable rubber or plastic, preferably of polyurethane having a durometer reading within a range of from 70 to 90, and has its lower edge portion beveled internally to engage a metal base member. The piston is compressed axially to force its lower edge portion outwardly into sealing engagement with the inner surface of the tubular cylinder. Whenever the lower edge portion of the piston becomes worn sufficiently to impair the effectiveness of the seal, the compression means is adjusted to compensate for the wear.

The metal base of the piston is secured to one end of a piston rod that reciprocates it during the operation of the dough dividing apparatus. When it is necessary to clean the apparatus, the piston may be readily separated from its base and then removed from the tubular cylinder to facilitate cleaning the apparatus.

The structure by means of which the above mentioned and other advantages of the invention are attained will be fully described in the following specification, taken in conjunction with the accompanying drawings showing a preferred illustrative embodiment of the invention, in which:

FIG. 1 is a view, partly in section and partly in elevation, showing the piston embodying the invention, with parts of the dough dividing apparatus with which it may be used; and FIG. 2 is an exploded sectional view, on an enlarged scale, of the piston and the base to which it is secured.

In the drawings, a piston 11 is slidably mounted in a tubular cylinder 12. The piston 11 may be made of rubber or any suitable plastic having a durometer reading within a range of from 70 to 90. The piston is preferably made of polyurethane. The lower end of the piston is recessed, as indicated at 13, and the inner surface of the piston defining the periphery of the recess 13 is beveled, as indicated at 14, for a purpose hereinafter disclosed. A relatively wide cylindrical bore 15 centrally disposed relative to the recess 13 extends upwardly from said recess.

The bore 15 terminates in spaced relationship to the upper surface 16 of the piston and is connected to a relatively short vertical recess 17 extending downwardly from the surface 16 by a narrow bore 18. The bore 18 is dimensioned to receive the shank 19 of a bolt 20. The head 21 of the bolt 20 is too large to enter the bore 18. The recess 17 is wide enough to receive a wrench (not shown) adapted to fit around the head 21 so that the bolt can be turned in either direction. The opposite end 22 of the bolt 20 is threaded to engage complementary threads of a nut 23. The bolt 20 is positioned with its head 21 in the recess 17 and its shank 19 extending through the bore 18, and the nut 23 is then threaded on the end 22 of the bolt and secured in place by a set screw 24.

The piston 11 is removably secured to a metal base 25 by the bolt 20. The upper end of the base has a flat surface 26 and is beveled at its outer edge, as indicated at 27, to enable it to fit within the recess 13. A centrally disposed recess 28 extends downwardly from the upper surface 26 of the base and is threaded to engage the threaded end 22 of the bolt. The nut 23 serves as a stop member and engages the top surface 26 of the base to limit the downward movement of the piston relative to the base 25. The nut 23 is located so that when it engages the surface 26 the beveled edge portions 14 of the piston are expanded outwardly into sealing engagement with the inner surface of the tubular cylinder 12 by axially compression of the piston. The base has a diameter equal to that of the piston, so that when the piston is secured to the base the outer surfaces of the base and the piston are in vertical alignment except for the annular portion of the piston expanded outwardly into sealing engagement with the cylinder.

The base 25 has a vertical bore 29 extending upwardly from its lower surface to receive the upper end of a piston rod 30. The upper end of the piston rod is secured to the base 25 by a horizontally disposed pin 31 that is driven into a transverse aperture 32 extending through the base and intersecting the bore 29. The pin 31 is longer than the diameter of the bore 29 and projects on both sides thereof when it is inserted through an aperture 33 in the upper end of the piston rod.

When the reciprocatory movement of the piston causes the outwardly expanded portion of the piston to wear sufficiently to impair the sealing engagement of the piston with the inner surface of the tubular cylinder, the effect of such wear can be neutralized by suitable adjustment of the parts. Movement of the nut 23 upwardly on the threaded end of the bolt 20 increases the distance the piston 11 may be moved downwardly toward the base 25 before such downward movement of the piston is stopped by the engagement of the nut 23 with the top surface 26 of the base member. The bolt 20 is unscrewed to disengage it from the recess 28, and is then lifted until its head 21 is out of the recess 17. The bore 15 permits upward movement of the bolt, with the nut 23 secured thereto, until the nut engages the top of the bore 15. The shank 19 of the bolt is then used as a handle to pull the piston upwardly out of the cylinder 11. The set screw 24 is loosened, and the nut 23 is threaded upwardly on the end 22 of the bolt far enough to compensate for the wear. The set screw is then tightened to hold the nut in its new adjusted position, and the piston is positioned in the cylinder 11 and again secured to the base 25.

As in the structure described in detail in the previously mentioned Patent No. 3,311,068 the upper end of the cylinder 12 is sealed by an inverted scaling cup 34 and a base plate 35 on which the scaling cup is mounted. The scaling cup comprises an open ended cylinder 36 secured at its lower end to the base plate 35 and an axially aligned cylindrical member 37 having an open end secured to the upper end of the cylinder 36. The lower end of the cylinder 36 is in registration with an opening 38 extending through the base plate 35. The upper end of the cylindrical member 37 has an end wall 39 extending thereacross. The upper portion of the cylindrical member 37 is offset inwardly to space its outer cylindrical surface from the inner cylindrical surface of a cylindrical sleeve 40 encircling the cylinder 37 and having its lower end secured to the upper end of the cylinder 36. A cylindrical member 41, comprising a top wall 42 and a cylindrical wall 43 having an open lower end, is positioned with its cylindrical wall 43 slidably mounted in the annular space 44 between the cylindrical member 37 and the cylindrical sleeve 40.

A stud 45, extending through an aperture in the top wall 42 is threaded into an aperture 46 in the end wall 39 of the cylindrical member 37 to regulate the axial movement of the cylindrical member 41 relative to the cylindrical member 37. An enlarged head 47 on the end of the stud 45 above the top wall 42 is provided with a thumb piece 48 to facilitate rotation thereof. Rotation of the stud 45 moves the cylindrical member 41 toward and away from the end wall 39. The cylindrical wall 43 has a longitudinal slot 49 terminating at one end a short distance from the top wall 42. A set screw 50 extends through the slot 49 and is threaded into a recess 51 in the end wall 39 to hold the cylindrical member 41 with the walls 39 and 42 in any desired spaced relationship. The spacing between the walls 39 and 42 regulates the capacity of the scaling cup, as hereinafter described.

The end wall 39 has a centrally disposed opening 52 through which a rod 53 extends. An enlarged head 54 on the upper end of the rod 53 limits the downward movement of the rod. A flat disk 55 secured to the other end of the rod 53 slides within the cylinder 36 and limits the capacity of the scaling cup. A spring 56 urges the disk 55 downwardly and causes the disk to discharge the dough from the scaling cup on to a conveyor (not shown) when the base plate is moved to move the scaling cup 34 out of registration with the cylinder 12. When the piston 11 pushes dough into the scaling cup, the dough moves the disk 55 upwardly until the enlarged head 54 of the rod 53 engages the top wall 42. The spring 56 always holds the disk 55 at a uniform distance from the end wall 39 when the scaling cup is empty, and therefore the distance between the walls 37 and 42, which limits the upward movement of the disk 55, regulates the capacity of the scaling cup.

The tubular cylinder 12 has an inlet opening 57 communicating with a discharge chute 58 adapted to receive dough from a hopper (not shown). A predetermined quantity of dough is sucked through the inlet opening 57 by the vacuum created by the piston on its down stroke, and the dough is then pushed upwardly into the scaling cup by the piston on its up stroke. The upper surface 16 of the piston is inclined to position its uppermost portion 59 in vertical alignment with the vertical diameter of the inlet opening 57. The vertical alignment of the uppermost portion of the piston and the vertical diameter of the inlet opening 57 facilitates the cutting action of the piston. The inclined surface of the top of the piston pushes the dough away from the inlet side of the cylinder and thereby keeps the dough within the cylinder as it is being pushed upwardly into the scaling cup.

Any suitable guide means may be provided to insure that whenever the piston is mounted in the cylinder, the vertical diameter of the inlet opening 57 is vertically aligned with the uppermost portion 59 of the upper surface of the piston. One suitable guide means comprises a vertically disposed interengageable rib and groove structure on the outer surface of the piston and the inner surface of the cylinder.

Although I have described a preferred embodiment of my invention in considerable detail, it will be understood that the description thereof is intended to be illustrative, rather than restrictive, as many details of structure may be modified or changed without departing from the spirit or scope of my invention. Accordingly, I do not desire to be restricted to the exact structure described.

I claim:

1. In combination, a resilient piston having a recess in its lower surface and a beveled surface defining the peripheral edge of said recess, a rigid base having an upper surface adapted to fit in said recess, a bolt extending axially through said piston with its head countersunk below the upper surface of said piston, threaded means associated with said base for engagement with said bolt whereby said piston may be removably secured to said base, and stop means on said bolt to limit the movement of said piston into engagement with said base.

2. The combination of claim 1 in which said stop means comprises a nut threaded on said bolt and a set screw adapted to hold said nut in fixed position on said bolt.

3. The combination of claim 1 in which said threaded means comprises a recess extending downwardly from the upper surface of said base.

4. The combination of claim 1 in which said stop means is adjustable to permit a predetermined amount of axial compression of said piston as it is moved into engagement with said base whereby the lower edge portion of said piston is expanded outwardly when said piston is secured to said base.

5. The combination of claim 1 in which said piston has a vertical bore extending upwardly from said recess, said bore terminating below the upper surface of said piston and having a transverse cross sectional area larger than the transverse cross sectional area of said stop means, whereby said bolt, upon release from engagement with said threaded means, may be lifted upwardly to serve as a handle for pulling said piston out of a tubular cylinder in which it is positioned.

6. The combination of claim 1 in which said piston is molded of polyurethane having a durometer reading within the range between 70 and 90.

References Cited

UNITED STATES PATENTS

| 1,523,986 | 1/1925 | Schmidt | 92—205 |
| 2,512,098 | 6/1950 | Gratzmuller | 92—250 X |
| 2,574,109 | 11/1951 | Kane et al. | 92—206 |

WALTER A. SCHEEL, *Primary Examiner.*

J. SHEA, *Assistant Examiner.*